United States Patent
Rosenberg et al.

(10) Patent No.: US 7,756,936 B2
(45) Date of Patent: Jul. 13, 2010

(54) USER INTERFACE FOR TRANSITIONING BETWEEN CHAT AND EMAIL

(75) Inventors: Greg A. Rosenberg, San Mateo, CA (US); James P. Kenney, San Francisco, CA (US); Ethan H. Diamond, San Francisco, CA (US); Samir B. Mehta, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 340 days.

(21) Appl. No.: 11/710,050

(22) Filed: Feb. 23, 2007

(65) Prior Publication Data

US 2008/0208984 A1    Aug. 28, 2008

(51) Int. Cl.
*G06F 15/16* (2006.01)
(52) U.S. Cl. ..................................... 709/206
(58) Field of Classification Search ................. 709/206, 709/204, 207
See application file for complete search history.

(56) References Cited

U.S. PATENT DOCUMENTS

| | | |
|---|---|---|
| 6,671,508 B1 | 12/2003 | Mitsuoka et al. |
| 7,080,148 B2 | 7/2006 | Weigand |
| 2001/0003202 A1 | 6/2001 | Mache et al. |
| 2001/0047305 A1 | 11/2001 | Bowen, Jr. |
| 2002/0007398 A1 | 1/2002 | Mendiola et al. |
| 2002/0107856 A1* | 8/2002 | Scheussler et al. ............ 707/10 |
| 2002/0108052 A1* | 8/2002 | Maruyama .................. 713/193 |
| 2003/0228722 A1 | 12/2003 | Wristers et al. |
| 2003/0229722 A1 | 12/2003 | Beyda |
| 2004/0054736 A1 | 3/2004 | Daniell et al. |
| 2004/0073621 A1 | 4/2004 | Sampson |
| 2004/0078446 A1* | 4/2004 | Daniell et al. ............... 709/206 |
| 2004/0078448 A1* | 4/2004 | Malik et al. ................. 709/206 |
| 2004/0181550 A1 | 9/2004 | Warsta et al. |
| 2005/0071434 A1* | 3/2005 | Hettish et al. ............... 709/207 |
| 2005/0091329 A1 | 4/2005 | Friskel |
| 2005/0132012 A1 | 6/2005 | Muller et al. |
| 2006/0025164 A1 | 2/2006 | Wang et al. |
| 2006/0052127 A1 | 3/2006 | Wolter |
| 2006/0101119 A1 | 5/2006 | Qureshi et al. |
| 2006/0168315 A1* | 7/2006 | Daniell et al. ............... 709/237 |
| 2007/0002825 A1 | 1/2007 | O'Brien et al. |
| 2007/0011186 A1 | 1/2007 | Horner et al. |

OTHER PUBLICATIONS

U.S. Appl. No. 11/261,984, filed Oct. 28, 2005, for Thompson et al.
U.S. Appl. No. 11/716,121, filed Mar. 8, 2007, for Rosenberg et al.
International Search Report mailed on Jul. 31, 2008, for PCT Application No. PCT/US2008/054622, filed on Feb. 21, 2008, four pages.
Written Opinion mailed on Jul. 31, 2008, for PCT Application No. PCT/US2008/054622, filed on Feb. 21, 2008, four pages.

* cited by examiner

*Primary Examiner*—Wing F Chan
*Assistant Examiner*—Tesfay Yohannes

(57) ABSTRACT

Instant messaging, also known as chat, is integrated with electronic mail in a user interface that provides for conversion of messages between electronic mail (email) and instant messaging. A user interface is provided for allowing a user who is composing an email message to convert the message to a chat message. The chat message will include any content that was present in the electronic mail message, and the user can continue to compose the chat message, and then send it to a chat address determined automatically from the email address of the original email message. Notifications are provided that indicate when chat users have logged on to or logged off from the chat service. These notifications assist a user composing a message to select the most appropriate communication method based upon the current online presence of the intended recipient. A user interface for converting messages in the opposite direction, from chat to email, is also provided.

21 Claims, 7 Drawing Sheets

USER INTERFACE FOR TRANSITIONING BETWEEN CHAT AND EMAIL

BACKGROUND OF THE INVENTION

Online chat, also known as instant messaging, provides for sending of chat messages between users. Each chat message is typically addressed to a particular recipient and is delivered to its recipient in near real-time. Chat users typically log into a chat service, and are available to respond to chat messages as long as they are logged in to the service. While a chat user is logged in, other chat users can send chat messages to the first user with some degree of certainty that the first user will read the chat messages in the near future. A chat service may provide online presence information, which indicates whether a user is logged in or otherwise available to respond to chat messages. The chat service may provide online presence information based on a user's login status. That is an online chat services able to provide a presence indicator because a user is required to log in or otherwise connect to the chat service. When a user logs out, chat messages become less effective for communicating with the user, because, for example, the user may not read the chat messages immediately. Some chat services may not permit chat messages to be sent to users who are not logged in.

Chat is particularly useful for sending messages to a recipient who is logged in to a chat service, but less useful when the recipient is not logged into the chat service. Chat is sometimes referred to as instant messaging because of the near real-time nature of a chat conversation. Chat typically involves a client program with which users interact. The client program sends and receives chat messages via a computer network to and from a chat service with which other client programs can also communicate. The chat service and the client programs provide delivery chat messages between different users in near real time. The client program typically has a user interface which displays chat messages received from other chat users. For example, in the Yahoo!® Messenger™ chat service, a client program interacts with the user to send chat messages to and from the chat service using a network protocol called YMSG. Other chat providers include Windows Live® Messenger and America Online's AOL Instant Messenger®. Each chat provider typically has its own protocol and provides a specialized client program for sending chat messages via that protocol.

Email can also provide near real-time communication, but many users prefer to use chat, because, for example, chat provides online presence information that indicates whether a user is currently available, since a chat user who is available is likely to respond quickly. However many users prefer to use email to communicate with others who are not locked into a chat service. Many users prefer to use email when chat is not available because email typically provides a more reliable medium for delivering messages. If an email messages is sent to a recipient who is not logged in, the email message will be retained by the email service until the user retrieves the message. Email and chat typically have separate user interfaces. If a user has composed a chat message to another chat user, but the other chat user logs out before the message has been sent, then the first user should re-create the message in email user interface to ensure that the message will be read. Furthermore the first user may not be aware that the second user has logged out and may continue to compose the chat message and send it, at which point the first user would learn that the message cannot be sent.

Therefore it would be desirable to minimize the effort, e.g. number of user interface actions, involved in creating an email message based on a previously composed chat message, and to notify users when other chat users become unavailable or logout of the chat service. Similarly, in the opposite direction, it would be desirable to allow email users to create chat messages based on previously composed email messages with minimal effort and to notify email users when chat users log into the chat service.

BRIEF SUMMARY OF THE INVENTION

In general, in a first aspect, the invention features message composition logic for converting a draft message from email to chat. The message composition logic includes email message conversion logic for converting a draft email message having email content to a draft chat message having chat content in response to a user command, wherein the draft email message includes a destination email address, chat addressing logic for identifying a chat correspondent that corresponds to the destination email address, and chat message sending logic for initiating transmission of the chat content to the chat correspondent.

Embodiments of the invention may include one or more of the following features. The email content may be accessible as chat content for use with the chat message. The message composition logic may further include chat message editing logic for receiving changes to the chat content. The user command may represent selection of a user interface button for converting the draft email message to the draft chat message. The email message conversion logic may be operable to copy the email content to the chat content. The chat content may comprise text. The chat message may comprise a text message, an instant message, or a combination thereof. The message composition logic may further include notification logic for displaying a notification in response to the user identified by the chat user identifier becoming available online, wherein the notification indicates that the user is online.

In general, in a second aspect, the invention features message composition logic for converting a draft message from chat to email. The message composition logic includes chat message conversion logic for converting a draft chat message having chat content to a draft email message having email content in response to a user command, wherein the draft chat message is associated with a chat correspondent email addressing logic for identifying an email addressee that corresponds to the chat correspondent, and email message sending logic for initiating transmission of the email content to the email addressee.

Embodiments of the invention may include one or more of the following features. The chat content may be accessible as email content for use with the draft email message. The message composition logic may further include email message editing logic for receiving changes to the email content. The user command may represent selection of a user interface button for converting the draft chat message to the draft email message. The chat message conversion logic may be operable to copy the chat content to the email content. The email content may comprise a text, graphics, at least one attached document, or a combination thereof. The message composition logic may further include notification logic for displaying a notification in response to the user identified by the chat user identifier becoming available online, wherein the notification indicates that the user is online.

In general, in a third aspect, the invention features a computer enabled method of transitioning a chat conversation with a remote party to electronic mail. The method comprises the steps of converting chat content to draft email content in response to selection of a user interface feature for converting the chat conversation to an email message, converting a chat address of the remote party to an email address of the remote party, displaying the draft email content, wherein the draft email content is addressed to the email address, and providing a send feature for initiating transmission of the draft email content to the email address.

Embodiments of the invention may include one or more of the following features. Converting chat content to email content may include adding a text representation of the chat content to the email message. The chat content may comprise at least one chat message, and converting the chat content to email content may comprise copying the at least one chat message to the email content. The method may be invoked if the remote party disengages from the chat conversation. Displaying draft email content may comprise displaying the draft email content in an email composition user interface.

In general, in a fourth aspect, the invention features a computer enabled method of transitioning a draft email message to a chat conversation with a remote party. The method includes the steps of converting email content to draft chat content in response to selection of a user interface feature for converting an email message to a chat message, converting an email address of the remote party to a chat address of the remote party, displaying the draft chat content, wherein the draft chat content is addressed to the chat address, and providing a send feature for initiating transmission of the draft chat content to the chat address.

In general, in a fifth aspect, the invention features a user interface for transitioning from chat communication to electronic mail communication. The user interface includes a chat display for displaying at least one chat message, wherein the at least one chat message includes chat content, and the at least one chat message is associated with a recipient chat user, a chat message composition user interface for receiving chat content, a convert to email feature for converting the chat content to email content, wherein the convert to email feature is operable to generate an email address that corresponds to the recipient chat user, and a send feature for sending the email content to the email address.

Embodiments of the invention may include one or more of the following features. The user interface may include an email composition user interface for allowing a user to edit the email content.

In general, in a fifth aspect, the invention features a user interface for transitioning from electronic mail communication to chat communication. The user interface includes an email composition user interface for allowing a user to compose email content addressed to an email addressee, a convert to chat feature for converting the email content to chat content, wherein the convert to chat feature is operable to identify a chat correspondent that corresponds to the email addressee, and a send feature for sending the chat content to the chat correspondent.

In general, in a fifth aspect, the invention features a computer program product comprising program code for composing a message. The computer program product includes program code operable to convert a draft email message having email content to a draft chat message having chat content in response to a user command, wherein the draft email message includes a destination email address, program code operable to identify a chat correspondent that corresponds to the destination email address, and program code operable to initiate transmission of the chat content to the chat correspondent.

In general, in a sixth aspect, the invention features a computer program product comprising program code for composing a message. The computer program product includes program code operable to convert a draft chat message having chat content to a draft email message having email content in response to a user command, wherein the draft chat message is associated with a chat correspondent, program code operable to identify an email addressee that corresponds to the chat correspondent, and program code operable to initiate transmission of the email content to the email addressee.

DETAILED DESCRIPTION OF THE INVENTION

The following description is presented to enable any person skilled in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1:
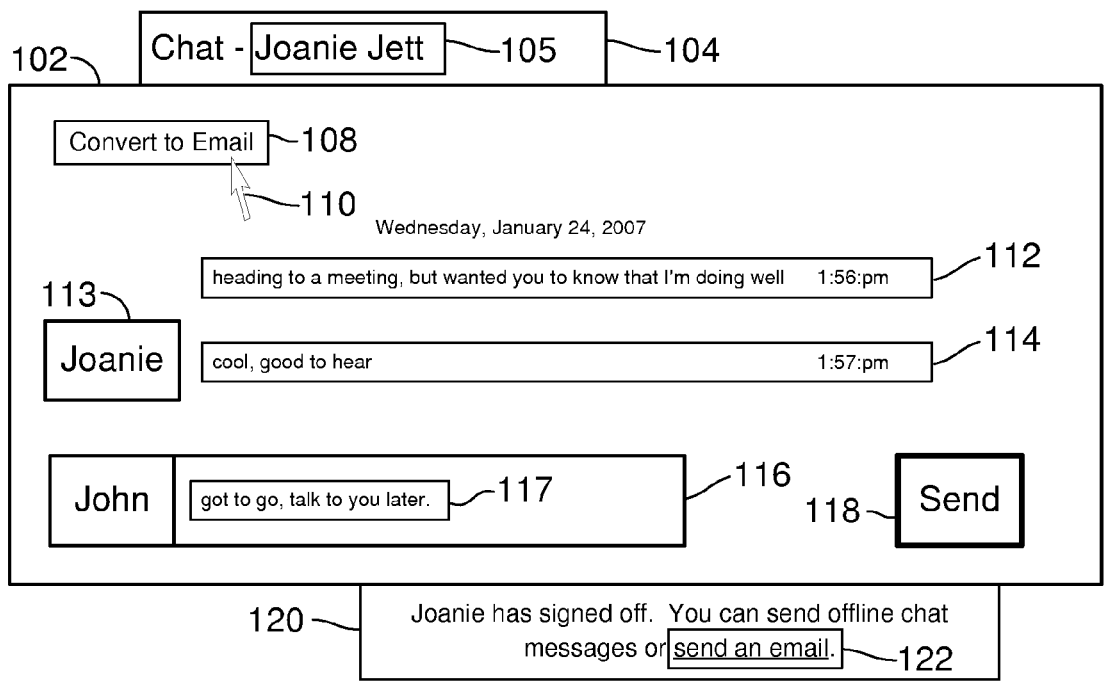
FIG. 1 is an illustrative drawing of a chat user interface having a convert to email feature in accordance with embodiments of the invention.

FIG. 1 is an illustrative drawing of a chat user interface 102 having a convert to email feature in accordance with embodiments of the invention. In one aspect the chat user interface 102 is provided by computer program code that executes on a computer system. The computer program code may be implemented in, for example, the JavaScript™ programming language or in other programming languages. The chat user interface 102 typically appears on a chat user's computer screen, for example in a web browser (not shown). The chat user interface 102 allows a user to participate in a chat conversation with a chat correspondent. In this example, the user of the chat interface 102 is named John, and the chat correspondent is named Joanie Jett. The chat user interface 102 includes a chat tab 104 which includes a correspondent identity 105 that visually identifies the chat correspondent as Joanie Jett. The chat correspondent is typically another user with whom the user of the chat user interface 102, e.g., John, is chatting.

The chat user interface 102 displays incoming chat messages 114 and send chat messages 112, and provides a chat message input area 116 into which a user may type a draft chat message 117 to be sent to the chat correspondent, e.g., Joanie Jett, as an outgoing chat message. The incoming chat message 114 was received from the user Joanie Jett, as shown by the label Joanie 113. A chat conversation typically consists of one or more chat messages 112, 114 sent between the user of the chat interface 102 and the correspondent identity 105, e.g., between John and Joanie Jett, respectively. The chat messages 112, 114 are typically sent via a computer network (not shown) using a chat protocol (also known as an instant messaging protocol) such as the Yahoo!® Messenger™ protocol YMSG. A user can click or select a Send button 118 to send the draft chat message 117 to the chat correspondent(s) 104, e.g., Joanie Jett.

In one aspect, when a chat correspondent logs on to or off of the chat service, a notification 120 appears. The notification 120 displays the name of the correspondent, a description of the correspondent's action, i.e., logged on or logged off, and an action link with the text "send an email," which the user can click on to perform a corresponding action. In this example, the notification 120 indicates that Joanie has logged off. The notification 120 also indicates that the user (John) can send off-line chat messages or send an email to Joanie Jett. A correspondent may log out of (or on to) the chat service at essentially any time, which may affect the type of message that the user (John) wishes to send. For example when the user is composing the draft chat message 117, and before the chat message has been sent, the correspondent to whom the message is addressed may log out of the chat service. In that case the user, e.g., John, of the chat user interface 102 may wish to send the draft chat message 117 using a different protocol, such as email. The user may also wish to continue composing the draft chat message 117 before sending it as an email.

Figure 2:
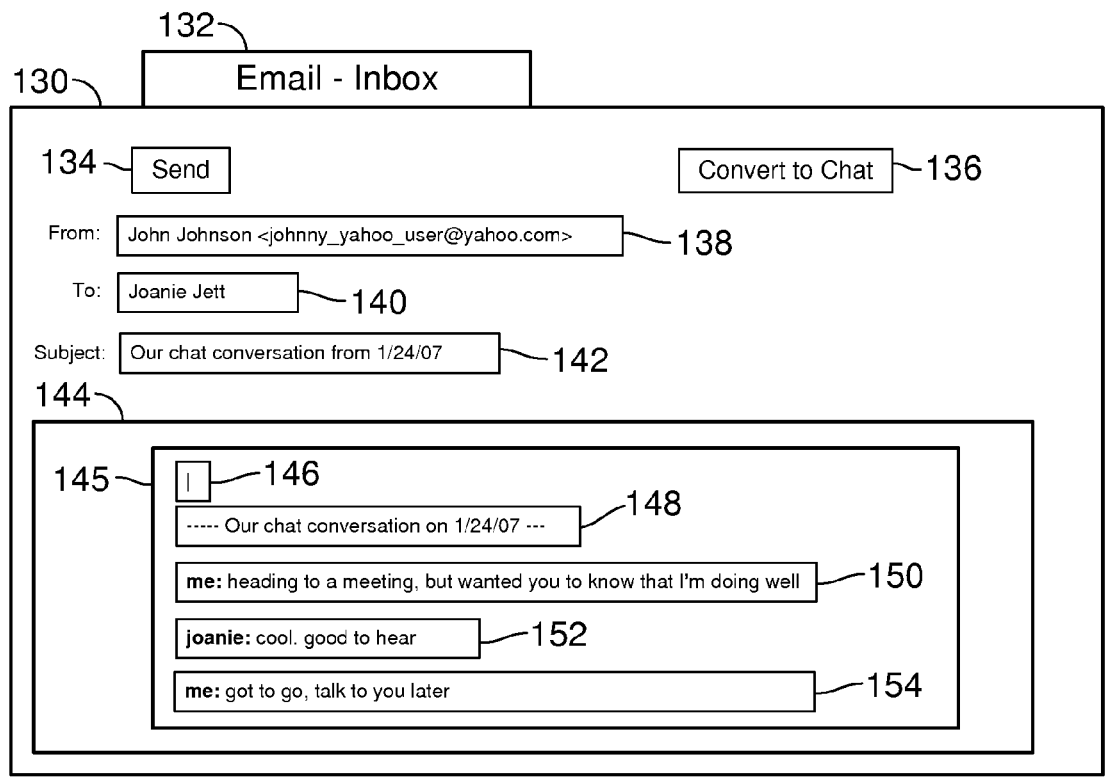
FIG. 2 is an illustrative drawing of an email composition user interface showing email text in accordance with embodiments of the invention.

In one aspect, a convert to email button 108 addresses this need. The convert to email button 108 causes execution of a conversion process that converts the chat user interface 102 to an email composition user interface 130, which is shown in FIG. 2. As part of the conversion process, the draft chat message 117, previous chat messages 112, 114 in the chat conversation, and the correspondent identity 105 are transferred, copied, or converted to a format suitable for sending as an email message. This conversion process is executed when the user clicks on or selects a convert to email button 108, e.g., with a mouse pointer 110 or by pressing a shortcut key, or when the user clicks or selects the send an email link 122, e.g., with the mouse pointer 110 or by pressing a shortcut key. Although two previous messages 112, 114 are shown, any number of previous chat messages may be transferred to email composition area 144. The transfer process is described in more detail below.

In one aspect, the convert to email button 108 and the send an email link 122 both perform the same action. These two alternate user interface features 108, 122 are provided to make the user interface easier to use. The notification 120 is generally only displayed for a limited time after a user has signed off, but the convert to email button 108 is displayed continuously until the chat user interface 102 is closed.

FIG. 2 is an illustrative drawing of an email composition user interface 130 showing email text in accordance with embodiments of the invention. In one aspect the email composition user interface 130 is provided by computer program code that executes on a computer system. The computer program code may be implemented in, for example, the JavaScript™ programming language or in other programming languages. The email composition user interface 130 typically appears on a chat user's computer screen, for example in a web browser (not shown). The email composition user interface 130 allows a user to send or receive email message to or from other users. In one aspect, the email composition user interface 130 shows the elements of an email message converted from the chat conversation of FIG. 1. In one aspect, the email user interface 130 appears in response to a user selecting a convert to email button 108. The email composition user interface 130 may also appear in response to a user selecting a command to compose a new email message.

The email composition user interface 130 includes a Send button 134 for causing content in the email composition area 144 to be sent as an email message to a user specified by a To field 140 with a subject 142. The conversion process automatically fills in the To field 140 by converting the correspondent identifier 105 to an email address of the user identified by the correspondent identifier 105. The conversion process fills in the subject field 142 by generating a subject such as "Our chat conversation from Jan. 24, 2007." The conversion process fills in the email composition area 144 with a header line 148 such as "Our chat conversation on Jan. 24, 2007" followed by the text of each chat message 112, 114 in the chat conversation. The conversion process copies some or all of the chat messages 112, 114 from the chat conversation to the email composition area 144. A threshold value may be used to limit the number of chat messages included in the email composition area 144. The draft chat message 117 is also copied to the email composition area 144. In one aspect, the entire content of the draft chat message 117 is copied to the email composition area 144; in other aspects, a portion of the draft chat message 117 is copied. The copied chat messages appear in the email composition area 144 in chronological order and are in one aspect a record of the chat conversation. A user identifier is pre-pended to each chat message when a chat messages added to the email composition area 144. A cursor 146 is positioned at the top of the email composition area 144 so that the user can begin composing email text above the record of the chat conversation. In this example the chat message 112 sent by John was copied to the email composition area 144 where the text of the message 112 appears as a line 150 with the prefix "me:", which indicates that the user (John) sent the chat message represented by the line 150. Similarly, the chat message 114 sent by Joanie was copied to the email composition area 144, where the text of the message 114 appears as a line 152 with the prefix "Joanie:". Furthermore the draft chat message 117 was copied to the email composition area 144 as a line 154 with the prefix "me:" A draft email message 145 that appears in the email composition area 144 includes the lines 148, 150, 152, 154. The email composition area 144 allows the user to add to or edit the draft email message 145 before sending it. The user may send the draft email message 145 to the email recipient specified in the To: field 140 by selecting, e.g., clicking on, the Send button 134.

In accordance with one embodiment, the draft chat message 117 is converted to the draft email message 145 by a chat-to-email conversion process that includes the steps of converting the chat address 105 to a destination email address 140, generating a subject 142 for the email message 145, and copying or converting the chat history including chat messages 112, 114 and draft chat message 117 to a draft email message 144 and including a header 148 at the beginning of the draft email message 144. Each of these steps is described in more detail below. In one aspect, the chat content of the draft chat message 117 is accessible as email content of the draft email message 144 because the process of copying or converting the chat history, including the chat messages 112, 114 and draft chat message 117, copies or converts the contents of those chat messages to the draft email message 144, so that the contents of those chat messages becomes the initial content of the draft email message 144. In some embodiments the content of all chat messages is copied to the draft email message 144; in other embodiments, the content of some or none of the chat messages is copied to the draft email message 144.

In one aspect, the chat address 105 is converted to a destination email address 140 by querying a lookup table that maps chat addresses to email addresses, and retrieving from the lookup table the email address that corresponds to the given chat address. The lookup table may be, for example a database table. The lookup table may also be provided by an online service such as a directory service. For example a chat user's chat address may be "Joanie" and the user's email address may be "Joanie@isp.com." An entry in a database table would associate Joanie's chat address with her email address by including Joanie in a chat address column, and Joanie@isp.com in an email address column. These entries may be established, for example, when Joanie's user account is created, or may be set by an administrator. In other aspects of the conversion from chat address to email address may be performed according to a mapping function for example by appending an Internet domain name to the chat address for the domain name is associated with the chat service. For example, if Joni's chat name is Joanie, and her chat provider is a company named ISP, then her email address would be obtained by appending ISP's domain name, isp.com, to her chat address to produce Joanie@isp.com. Other techniques for converting chat addresses to email addresses are possible. The techniques described herein are provided for illustrative purposes.

A subject for the email message's subject field 142 is generated for the email message 145 based on information about the existing chat conversation that is being converted to email. In one aspect the subject is generated by appending the date of the chat conversations to descriptive string, such as "Our chat conversation." A subject generated using this technique is shown in the subject field 142.

The draft email message 145 is generated by combining some or all of the messages in the chat conversation. That is, possibly subject to a threshold limit on the number of chat messages to be copied to the email message, each chat message in the chat conversation is copied to the email message. The name or identity of the correspondent who sent each chat message is also copied to the email message and appears as a prefix on the chat message. For example, for the chat message 114, which reads "cool, good to hear" that was sent by Joanie, the text "joanie: cool, good to hear" would appear in the email message 145. According to the conversion process each chat message 112, 114 would be copied to the draft email message 144, to form line phones 150, 152, respectively. Furthermore a descriptive header line of text 148, which is similar to the subject 142, is copied to the draft email message 145 and appears as the first line in the draft email message 145. The draft chat message 117, if present, is copied to the last line of the draft email message 144. For example, the draft chat message 117, which reads "got to go, talk to you later", is copied to line 154 in the draft email message 144, where it becomes "me: got to go, talk to you later."

The email composition interface 130 includes a convert to chat button 136 for converting the draft email message 145 to a draft chat message 117. That is, the convert to chat button 136 performs essentially the reverse function of the convert to email button 108. The convert to chat function is typically slightly different from the convert to email function, however. In one aspect, the convert to chat function converts the draft email message 145 to a single draft chat message 117 that appears in the chat user interface 102. Some or all of the content of the draft email message 145 may be copied to the chat message input area 116 to form the draft chat message 117. Conversion of an email message to a chat message is described below with respect to FIGS. 3 and 4.

Figure 3:
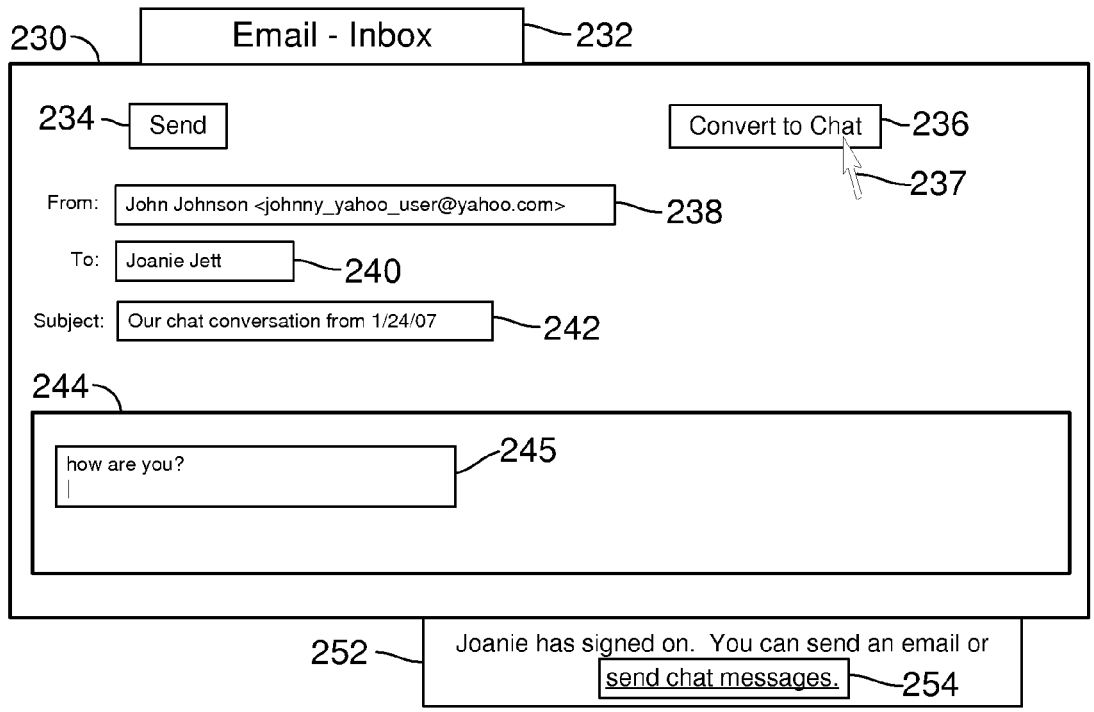
FIG. 3 is an illustrative drawing of an email composition user interface having a convert to chat feature in accordance with embodiments of the invention.
Figure 4:
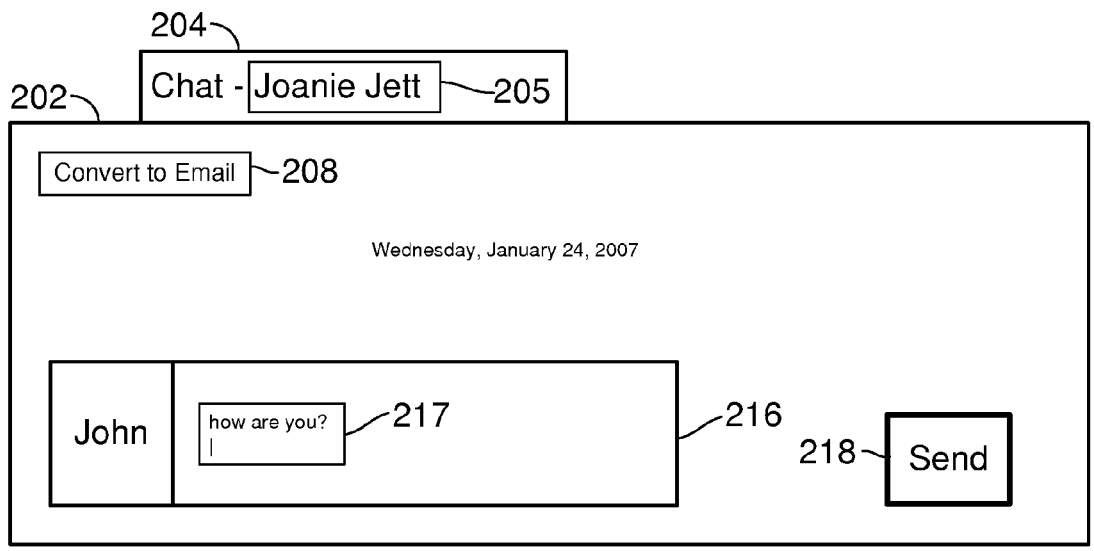
FIG. 4 is an illustrative drawing of a chat user interface having chat text in accordance with embodiments of the invention.

FIG. 3 is an illustrative drawing of an email composition user interface 230 having a convert to chat feature in accordance with embodiments of the invention. The email composition user interface 230 is similar to the email composition user interface 130 of FIG. 2. but is shown with a different draft email message 250 for illustrative purposes. The draft email message 250 includes the text "how are you?" and is addressed to Joanie Jett, as shown by to the To field 240. In this example, Joanie Jett has recently logged onto a chat service, so the email composition user interface 230 has displayed a notification 252 indicating that Joanie Jett has signed on. The notification 252 provides an action link with the text "send chat messages." The user can click on or select the action link to begin sending chat messages to the user i (Joanie). If the user clicks the "send chat messages" action link, a chat user interface 202, as shown in FIG. 4, will be displayed. As an alternative to the "send chat messages" action link, the user may click on the convert to chat button 226. A mouse pointer 237 is shown pointing to the convert to chat button 236 to indicate that the user is about to click the button 236. By clicking on the Convert to Chat button 236, the user selects the button, and the email message 244 will be converted to a draft chat message 216 that the user can edit or send in a chat composition interface 202. The user may achieve the same result by clicking the "send chat messages" link 254. If the user clicks either the convert to chat button 236 or the "send chat messages" link, the chat user interface 202 will be displayed, with the draft chat message 250 copied to a draft email message 217, and the chat correspondent 205 set to a chat address that corresponds to the To address 240 of the email composition interface. Therefore, in one aspect, the email content is accessible as chat content for use with the chat message, because the email content 245 has been copied to the chat content 217 of the chat message 216, and the user can continue to edit the chat message 216, or send the chat message 216 by selecting the Send button 218.

FIG. 4 is an illustrative drawing of a chat user interface in accordance with embodiments of the invention. When the user presses the Send button 218, the draft chat message 217 will be sent to the chat correspondent 204, i.e., Joanie Jett. The chat user interface 202 also includes a convert to email button 208, which the user can select to switch back to the email composition user interface 230, as described above with respect to FIGS. 1 and 2.

The chat user interface 202 is displayed and configured by an email to chat conversion process which sets the chat correspondent 205 based upon the To address 240, and fills in a chat message input area 216 with the text of the draft email message 250 to form a draft chat message 217. In one aspect, the chat correspondent 205 is determined by querying a lookup table that maps email addresses to chat addresses. The lookup table described above for converting chat addresses to email addresses may be used by retrieving from the lookup table the chat address that corresponds to the given email address. The other alternatives described above, such as a web service, or a function, may also be used. A function may convert email addresses to chat addresses by, for example, stripping the @ sign and the domain name from the email address, if the email and chat addresses are constructed so that they share the same user name for a particular user.

Figure 5:
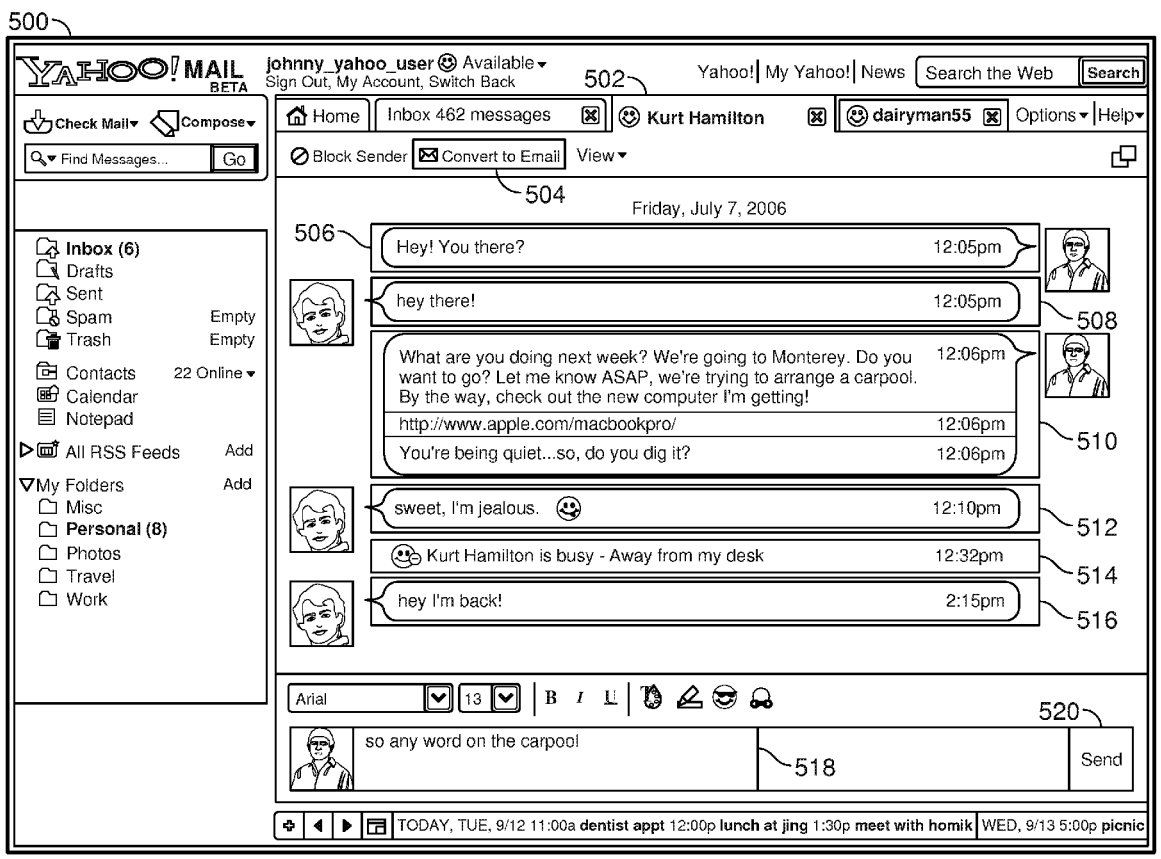
FIG. 5 is an illustrative drawing of a chat user interface in accordance with embodiments of the invention.

FIG. 5 is an illustrative drawing of a chat user interface 500 in accordance with embodiments of the invention. In one aspect, the user interface 500 includes a chat composition tab 502, which is a user interface that displays chat messages 506 through 516 of a chat conversation. The chat composition tab 502 also provides a chat editing feature 518 for receiving a chat message from the user, and a send button 520 for sending the chat message to the chat correspondent identified at the top of the chat composition tab 502, e.g., Kurt Hamilton. The chat composition tab 502 also provides a Convert to Email button 504, which the user may select, e.g., by a mouse click, to initiate the process of converting the chat messages 506 though 516 and the draft chat message 518 to an email message to be sent to Kurt Hamilton's email address. In one aspect, the Convert to Email button 504 does not cause the resulting email message to be sent. Instead, the button 504 causes an email composition user interface to be displayed, so that the user can continue to edit the email message before sending it.

Figure 6:
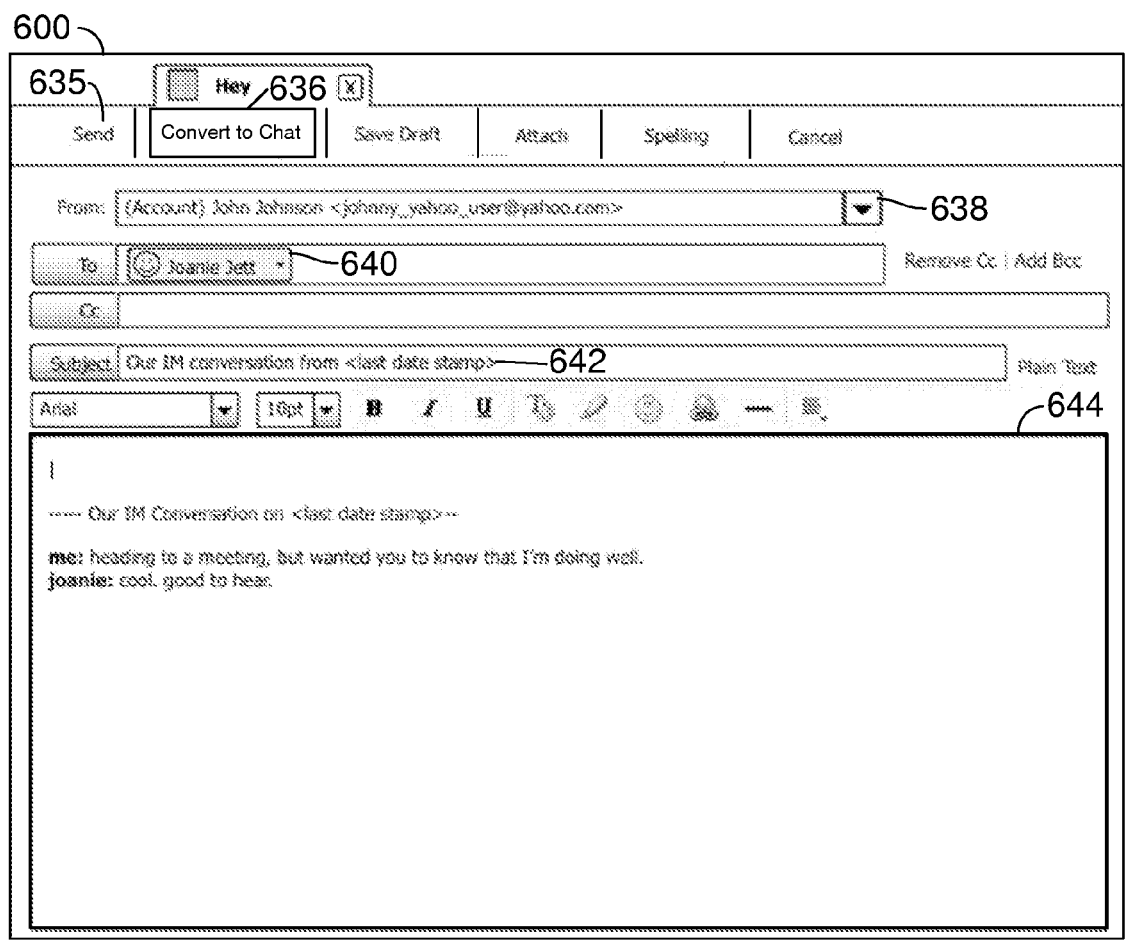
FIG. 6 is illustrated drawing of an email composition user interface in accordance with embodiments of the invention.

FIG. 6 is illustrated drawing of an email composition user interface 600 in accordance with embodiments of the invention. In one aspect, the email composition user interface 600 allows a composing user to compose an email message, and displays a From address 638, which indicates the name of the sender, who is the user composing the email, and a To address 640, which displays the name of a user to whom the email is addressed, i.e., the addressee. In one aspect, the To address 640 is selected by the composing user. A subject 642 is associated with the email message being composed. A text editor panel 644 allows the composing user to provide content for the email message. A Send button 635 can be selected by the user to send the content in the text editor panel 644. A Convert to Chat button 636 can be selected by the user to convert the content to a chat (i.e., instant messaging) message to be sent to the user identified by the To address 640 via chat. A chat address will be determined automatically for the user identified by the To address 640 using, for example, the address book or contact list associated with the composing user.

Figure 7:
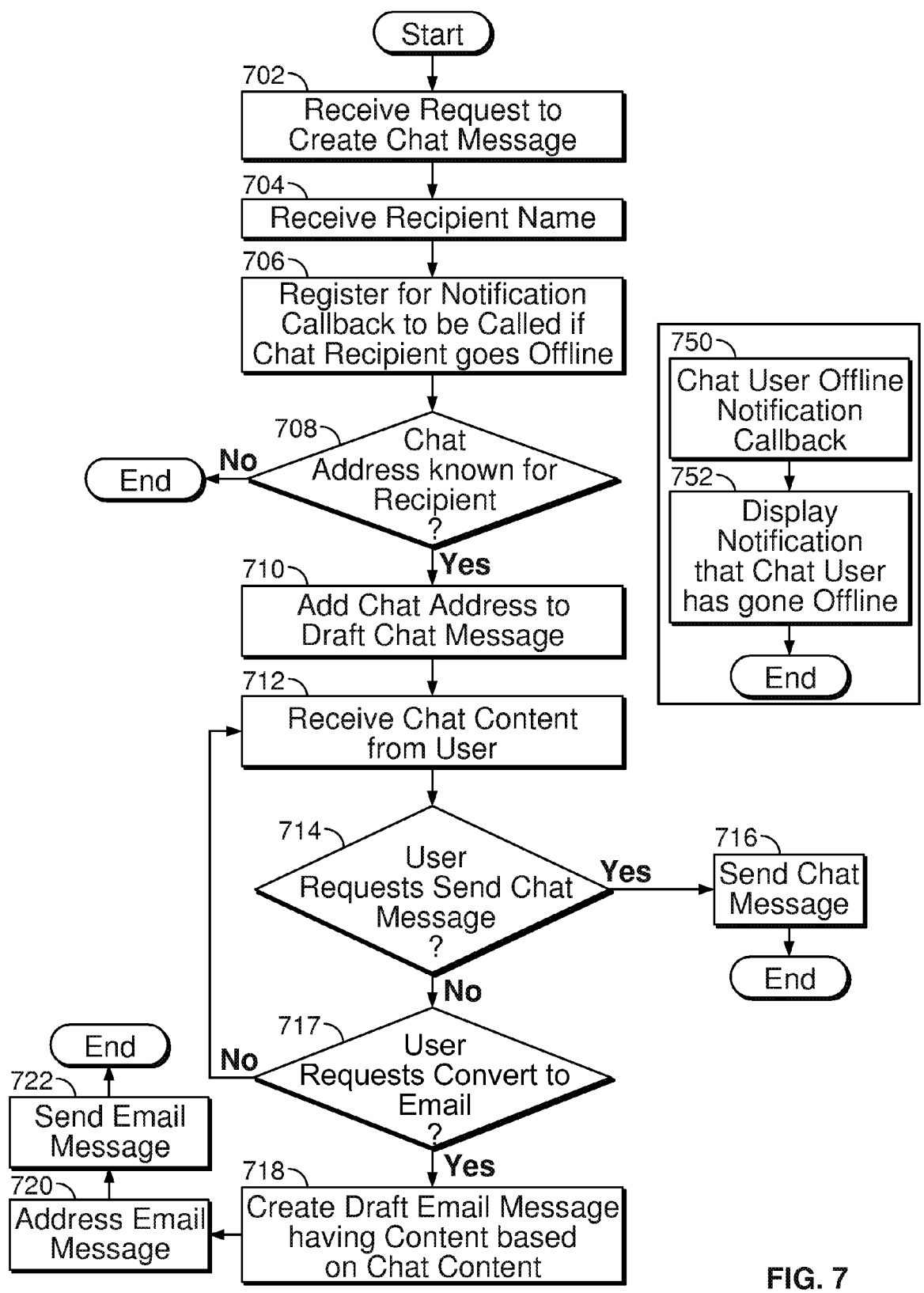
FIG. 7 is an illustrative flow diagram of a conversion process for converting a chat message to an email message in accordance with embodiments of the invention.

FIG. 7 is an illustrative flow diagram of a conversion process for converting a chat message to an email message in accordance with embodiments of the invention. The conversion process begins at block 702 by receiving a request to create a chat message. Block 704 receives the recipient name, and block 706 registers for a notification callback to be called if the recipient goes offline (e.g., signs out of the chat service, or is otherwise disconnected from the chat service). Block 708 determines if a chat address is known for the recipient. If so, block 710 adds the chat address to a draft chat message, and execution continues past block 710. If not, execution terminates. At block 712, chat content may be received from the composing user. The chat content may be empty, i.e., the chat content is optional. Block 714 determines if the user has pressed the Send button to send the chat message. If so, block 716 sends the chat message via a chat protocol and the process terminates. If not, block 717 determines if the user has pressed the Convert to Email button, i.e., requested that the chat message be converted to an email message. If not, the process continues to accept input from the composing user. If so, block 718 creates a draft email message that has content based on the chat content. For example, block 718 may copy the chat content to the email message content. Block 720 sets the address of the email message to the email address corresponding to the chat address (i.e., recipient name) that was provided in block 704. Block 720 may use an address book or contact list associated with the composing user, or may consult a directory service. Block 722 causes the email message to be sent, e.g., using an email protocol such as SMTP, or otherwise sending the email message to the email address. Before the email message is sent, the composing user may be given an opportunity to edit the email message in an email text editor panel in the user interface. Furthermore, a Convert to Chat button may be provided in the user interface for allowing the user to convert the email message back to a chat message.

The notification of a user becoming unavailable is provided by blocks 750 and 752. In one aspect, block 750 is invoked when the chat user status notification callback registered in block 706 is called. Such a notification callback can be implemented using techniques known to those skilled in the art. Block 752 displays a notification message, e.g., as a text window. The notification message indicates that the chat user has gone offline.

Figure 8:
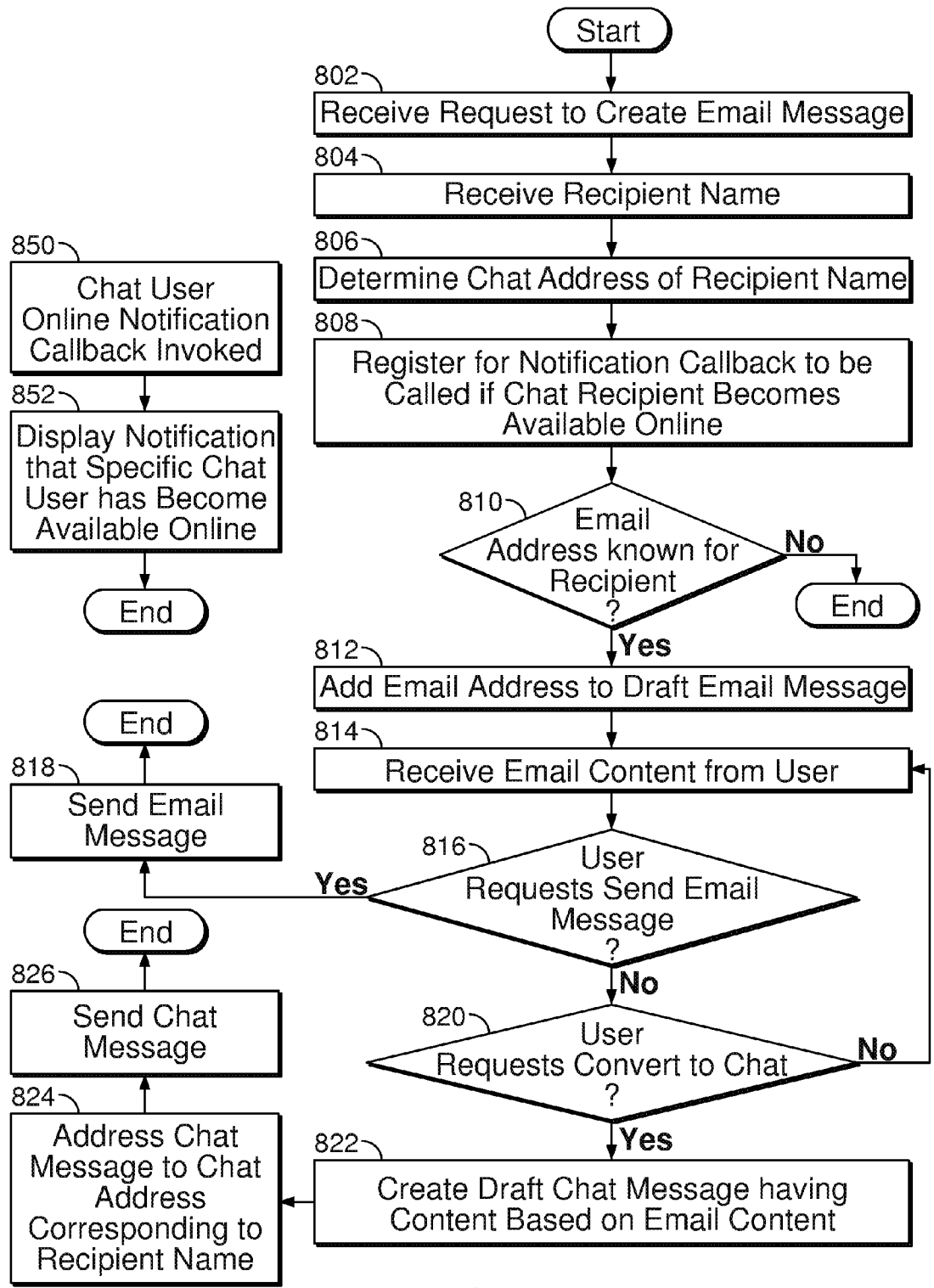
FIG. 8 is an illustrative flow diagram of a conversion process for converting an email message to a chat message in accordance with embodiments of the invention.

FIG. 8 is an illustrative flow diagram of a conversion process for converting an email message to a chat message in accordance with embodiments of the invention. The email to chat conversion process begins at block 802 by receiving a request to create an email message. Block 804 receives the email recipient's name, which may be an email address or an address book name, which is associated with an email address. Block 806 determines the chat address of the email recipient. Block 808 registers for a notification callback to be called if the chat recipient identified by the chat address becomes available online, e.g. logs into the chat service. Block 810 determines if an email address is known for the recipient. If no email address is known, as may be the case when an invalid name is provided, the process ends. Otherwise, if the email address is known or valid, block 812 adds the email address to a draft email message. Block 814 receives email content from the user composing the email message. Block 816 determines if the user has selected the Send button to send the email message. If so, block 818 sends the email message, and the process terminates. If not, block 820 determines if the user has selected the Convert to Chat button to request that the email message be converted to a chat message. If not, the user interface continues to accept input from the composing user. If the user has selected the Convert to Chat button, block 822 creates a draft chat message having draft chat content based upon the email content. The draft chat content may be, for example, copied from the email content. Block 824 sets the destination address of the chat message to a chat address that corresponds to the email address or name received at block 804. Block 824 may use a contact list or address book associated with the composing user, or may invoke an online directory service or other service, or may query a database to determine the chat address of the chat correspondent. The user may be given an opportunity to edit the draft chat content before sending it to the chat correspondent. Block 826 sends the chat message when the user has pressed the Send button in the chat message composition interface.

Figure 9:
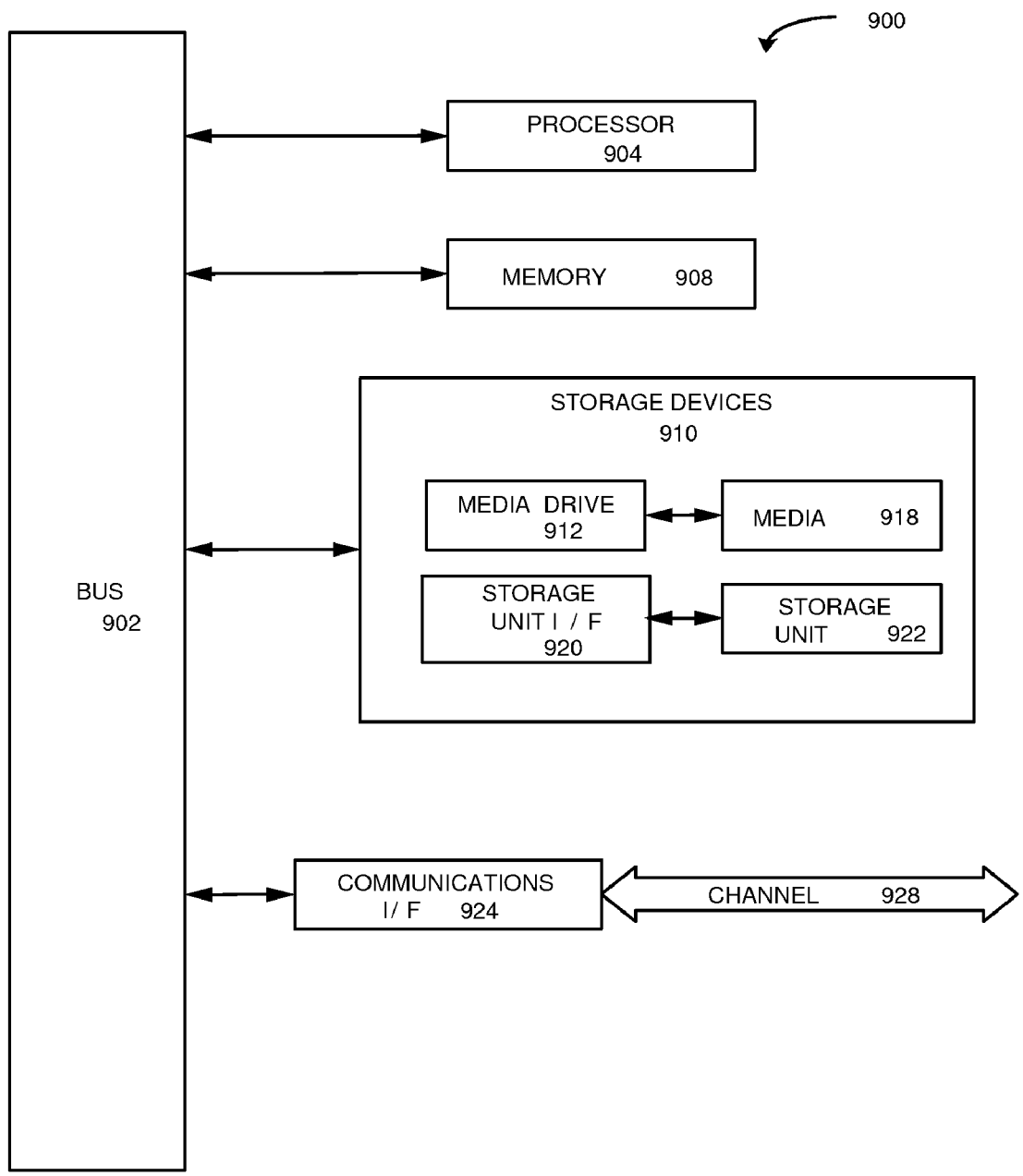
FIG. 9 is an illustrative drawing of an exemplary computer system that may be used in accordance with embodiments of the invention.

FIG. 9 is an illustrative drawing of an exemplary computer system that may be used in accordance with embodiments of the invention. FIG. 9 illustrates a typical computing system 900 that may be employed to implement processing functionality in embodiments of the invention. Computing systems of this type may be used in clients and servers, for example. Those skilled in the relevant art will also recognize how to implement the invention using other computer systems or architectures. Computing system 900 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage system 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918, may include, for example, a hard disk, floppy disk, magnetic tape, optical disk, CD or DVD, or other fixed or removable medium that is read by and written to by media drive 914. As these examples illustrate, the storage media 918 may include a computer-readable storage medium having stored therein particular computer software or data.

In alternative embodiments, information storage system 910 may include other similar components for allowing computer programs or other instructions or data to be loaded into computing system 900. Such components may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals which can be electronic, electromagnetic, optical or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product," "computer-readable medium" and the like may be used generally to refer to media such as, for example, memory 908, storage device 918, or storage unit 922. These and other forms of computer-readable media may be involved in storing one or more instructions for use by processor 904, to cause the processor to perform specified operations. Such instructions, generally referred to as "computer program code" (which may be grouped in the form of computer programs or other groupings), when executed, enable the computing system 900 to perform features or functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 900 using, for example, removable storage drive 914, drive 912 or communications interface 924. The control logic (in this example, software instructions or computer program code), when executed by the processor 904, causes the processor 904 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Moreover, it will be appreciated that various modifications and alterations may be made by those skilled in the art without departing from the spirit and scope of the invention. The invention is not to be limited by the foregoing illustrative details, but is to be defined according to the claims.

What is claimed is:

1. A computer-readable storage medium storing computer-readable instructions, the instructions for:
   converting a draft outgoing email message having email content to a draft outgoing chat message having chat content, corresponding to the email content, in response to a user command,
       wherein the email content is formatted in an email format and the chat content is formatted in a chat format, the draft outgoing email message includes a destination email address, and the chat content is accessible by a user for composing the draft outgoing chat message;

identifying a chat correspondent that corresponds to the destination email address; and initiating transmission of the chat message to the chat correspondent.

2. The computer-readable storage medium of claim 1, further comprising computer readable instructions for receiving user-specified changes to the chat content.

3. The computer-readable storage medium of claim 1, wherein the user command represents selection of a user interface button for converting the draft outgoing email message to the draft outgoing chat message.

4. The computer-readable storage medium of claim 1, wherein the email content is copied to the chat content.

5. The computer-readable storage medium of claim 1, wherein the chat content comprises text.

6. The computer-readable storage medium of claim 1, wherein the chat message comprises a text message, an instant message, or a combination thereof.

7. The computer-readable storage medium of claim 1, further comprising computer readable instructions for:

displaying a notification in response to the user identified by the chat user identifier becoming available online, wherein the notification indicates that the user is online.

8. A computer-readable storage medium storing computer-readable instructions, the instructions for:

converting a draft outgoing chat message having chat content to a draft outgoing email message having email content, corresponding to the chat content, in response to a user command, wherein the chat content is formatted in a chat format and the email content is formatted in an email format, the draft outgoing chat message is associated with a chat correspondent, and the email content is accessible by a user for composing the draft outgoing email message;

identifying an email addressee that corresponds to the chat correspondent; and initiating transmission of the email message to the email addressee.

9. The computer-readable storage medium of claim 8, further comprising computer readable instructions for: receiving user-specified changes to the email content.

10. The computer-readable storage medium of claim 8, wherein the user command represents selection of a user interface button for converting the draft outgoing chat message to the draft outgoing email message.

11. The computer-readable storage medium of claim 8, wherein email content is copied to the chat content.

12. The computer-readable storage medium of claim 8, wherein the email content comprises text, graphics, at least one attached document, or a combination thereof.

13. The computer-readable storage medium of claim 8, further comprising computer-readable instructions for:

displaying a notification in response to the user identified by the chat user identifier becoming available online, wherein the notification indicates that the user is online.

14. A computer enabled method of transitioning a chat conversation with a remote party to electronic mail, the method comprising the steps of:

converting chat content to draft outgoing email content in response to selection of a user interface feature for converting the chat conversation to an outgoing email message;

converting a chat address of the remote party to an email address of the remote party; displaying the draft outgoing email content, wherein the draft outgoing email content is addressed to the email address; and providing a send feature for initiating transmission of the draft outgoing email message to the email address.

15. The method of claim 14, wherein converting chat content to email content comprises adding a text representation of the chat content to the email message.

16. The method of claim 14, wherein converting the chat content to email content comprises copying the chat content to the email content.

17. The method of claim 14, wherein the method is invoked if the remote party disengages from the chat conversation.

18. The method of claim 14, wherein displaying draft email content comprises displaying the draft outgoing email content in an email composition user interface.

19. A computer system for providing a user interface for transitioning from electronic mail communication to chat communication, the computer system comprising:

a memory storing computer-readable instructions for:

displaying an email composition user interface for allowing a user to compose outgoing email content addressed to an email addressee, providing a convert to chat feature for converting the outgoing email content to chat content, wherein the email content is formatted in an email format and the chat content is formatted in a chat format, the convert to chat feature is operable to identify a chat correspondent that corresponds to the email addressee, the chat content is accessible by the user for composing an outgoing chat message, providing a send feature for sending the chat message to the chat correspondent; and a processor for executing the computer-readable instructions.

20. A computer system comprising:

a memory storing computer-readable instructions, the instructions for:

converting a draft outgoing email message having email content to a draft outgoing chat message having chat content in response to a user command, wherein, the email content is formatted in an email format and the chat content is formatted in a chat format, the draft outgoing email message includes a destination email address, the chat content is accessible by a user for composing the draft outgoing chat message;

identifying a chat correspondent that corresponds to the destination email address;

initiating transmission of the chat message to the chat correspondent; and a processor for causing the computer-readable instructions to be sent to a client computer for execution.

21. A computer system comprising:

a memory storing computer-readable instructions, the instructions for:

converting a draft outgoing chat message having chat content to a draft outgoing email message having email content in response to a user command, wherein, the chat content is formatted in a chat format and the email content is formatted in an email format, the draft outgoing chat message is associated with a chat correspondent, the email content is accessible by a user for composing the draft outgoing email message;

identifying an email addressee that corresponds to the chat correspondent;

initiating transmission of the email message to the email addressee; and a processor for causing the computer-readable instructions to be sent to a client computer for execution.

* * * * *